(12) United States Patent
Lim et al.

(10) Patent No.: US 9,906,076 B2
(45) Date of Patent: Feb. 27, 2018

(54) NON-CONTACT TYPE POWER TRANSMITTING COIL AND NON-CONTACT TYPE POWER SUPPLYING APPARATUS

(71) Applicant: SAMSUNG ELECTRO-MECHANICS CO., LTD., Suwon-Si (KR)

(72) Inventors: Hyun Keun Lim, Suwon-Si (KR); Ki Won Chang, Suwon-Si (KR); Jae Suk Sung, Suwon-si (KR); Sung Uk Lee, Suwon-Si (KR); Chang Soo Kang, Suwon-Si (KR); Si Hyung Kim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 663 days.

(21) Appl. No.: 14/536,471

(22) Filed: Nov. 7, 2014

(65) Prior Publication Data
US 2015/0130291 A1    May 14, 2015

(30) Foreign Application Priority Data

Nov. 11, 2013 (KR) .................. 10-2013-0136570
Jun. 25, 2014 (KR) .................. 10-2014-0078487
Jul. 29, 2014 (KR) .................. 10-2014-0096826

(51) Int. Cl.
*H01F 38/14* (2006.01)
*H02J 50/10* (2016.01)
(Continued)

(52) U.S. Cl.
CPC .......... *H02J 50/10* (2016.02); *H01F 27/2804* (2013.01); *H01F 38/14* (2013.01);
(Continued)

(58) Field of Classification Search
CPC ..... H01F 38/14; H01F 27/2804; H01Q 1/225; H01Q 7/00; H02J 5/005
(Continued)

(56) References Cited

U.S. PATENT DOCUMENTS

2004/0256468 A1    12/2004  Akiho et al.
2008/0067874 A1     3/2008  Tseng
(Continued)

FOREIGN PATENT DOCUMENTS

CN    1312928 A      9/2001
CN    100419787 C    9/2008
(Continued)

OTHER PUBLICATIONS

Korean Office Action dated Dec. 28, 2015 in counterpart Korean Patent Application No. 10-2014-0096826 (9 pages, with English translation).
(Continued)

*Primary Examiner* — Robert DeBeradinis
(74) *Attorney, Agent, or Firm* — NSIP Law

(57) ABSTRACT

A non-contact type power transmitting coil may include at least one conductor pattern disposed on at least one surface of a base having a predetermined area, having a plurality of turns, and transmitting received power externally in a non-contact manner. The intervals between at least some of adjacent pattern portions of the conductor pattern in a direction from a center portion of an inner diameter of the conductor pattern to an outermost pattern portion conductor pattern may be different from one another.

26 Claims, 13 Drawing Sheets

(51) Int. Cl.
*H02J 5/00* (2016.01)
*H01F 27/28* (2006.01)
*H01Q 1/22* (2006.01)
*H01Q 7/00* (2006.01)

(52) U.S. Cl.
CPC ............. *H01Q 1/2225* (2013.01); *H01Q 7/00* (2013.01); *H02J 5/005* (2013.01)

(58) Field of Classification Search
USPC .......................................................... 307/104
See application file for complete search history.

(56) References Cited

U.S. PATENT DOCUMENTS

| | | |
|---|---|---|
| 2010/0164670 A1 | 7/2010 | Nakahori et al. |
| 2012/0092222 A1 | 4/2012 | Kato et al. |
| 2012/0146580 A1 | 6/2012 | Kitamura |
| 2012/0223586 A1 | 9/2012 | Gotani |
| 2013/0069445 A1* | 3/2013 | Waffenschmidt ....... H01F 38/14 307/104 |
| 2013/0154383 A1 | 6/2013 | Kasturi et al. |
| 2013/0285605 A1 | 10/2013 | Partovi |
| 2013/0285608 A1 | 10/2013 | Jikihara |
| 2014/0111152 A1 | 4/2014 | Kai |

FOREIGN PATENT DOCUMENTS

| | | |
|---|---|---|
| CN | 102906831 A | 1/2013 |
| EP | 1 110 163 A1 | 6/2001 |
| EP | 2512205 A1 | 10/2012 |
| JP | 5-66936 U | 9/1993 |
| JP | 2000-58323 A | 2/2000 |
| JP | 2003-109830 A | 4/2003 |
| JP | 2004-118440 A | 4/2004 |
| JP | 2009-106126 A | 5/2009 |
| JP | 2010-153416 A | 7/2010 |
| JP | 2011-72074 A | 4/2011 |
| JP | 2013-533607 A | 8/2013 |
| JP | 2013-214614 A | 10/2013 |
| KR | 10-2012-0127991 A | 11/2012 |
| KR | 10-1261267 B1 | 5/2013 |
| KR | 10-2013-0093667 A | 8/2013 |
| WO | 00/10112 A1 | 2/2000 |
| WO | WO 2011/148291 A1 | 12/2011 |

OTHER PUBLICATIONS

European Office Action dated Mar. 31, 2016 in counterpart European Application No. 14275231.0 (6 pages, in English).

Chinese Office Action dated May 24, 2016 in counterpart Chinese Patent Application No. 201410643926.2 (33 pages, with English translation).

Extended European Search Report dated Mar. 2, 2015 for European Patent Application No. 14275231.0.

Japanese Office Action dated Oct. 6, 2015 in counterpart Japanese Application No. 2014-229351 (7 pages, with English translation).

* cited by examiner

NON-CONTACT TYPE POWER TRANSMITTING COIL AND NON-CONTACT TYPE POWER SUPPLYING APPARATUS

CROSS-REFERENCE TO RELATED APPLICATIONS

This application claims the benefit of Korean Patent Application Nos. 10-2013-0136570 filed on Nov. 11, 2013, 10-2014-0078487, filed on Jun. 25, 2014, and 10-2014-0096826, filed on Jul. 29, 2014, with the Korean Intellectual Property Office, the disclosures of which are incorporated in their entireties herein by reference.

BACKGROUND

The present disclosure generally relates to a non-contact type power transmitting coil and a non-contact type power supplying apparatus.

In general, supplying power as an energy source may be needed to operate an electronic apparatus. For example, power may be supplied from an external source, and a self-sustaining apparatus may be able to obtain electrical power through the self-generation thereof.

In order to supply external power to the electronic apparatus, a power supplying apparatus for transmitting power from an external power source to the electronic apparatus may be needed.

A wired-type power supplying apparatus may be connected directly to the electronic apparatus through a connector, or the like, to supply power to a battery provided in the electronic apparatus. A non-contact type power supplying apparatus may supply power to the battery provided in the electronic apparatus in a non-contact manner using, for example, a magnetic induction effect or a magnetic resonance effect.

For instance, to transmit power in the non-contact manner through the magnetic induction effect or magnetic resonance effect, a power transmitting coil and a power receiving coil may be used to be disposed adjacently to one another. In this regard, there may arise issues of, for example, power transmission efficiency and levels of transmittable power based on a distance between the power transmitting coil and the power receiving coil.

RELATED ART DOCUMENT

Patent Document (Patent Document 1) Korean Patent Laid-Open Publication No. 10-2013-0093667

SUMMARY

Some embodiments of the present disclosure may provide a non-contact type power transmitting coil and a non-contact type power supplying apparatus capable of suppressing a decrease in power transmission efficiency depending on positions of a power transmitting coil and a power receiving coil disposed on or over a power transmitting surface.

According to an aspect of the present disclosure, a non-contact type power transmitting coil may include at least one conductor pattern disposed on at least one surface of a base having a predetermined area, having a plurality of turns, and transmitting received power externally in a non-contact manner. Intervals between at least some of adjacent pattern portions of the conductor pattern in a direction from a center of an inner diameter of the conductor pattern to an outermost pattern portion of the conductor pattern may be different from one another.

According to another aspect of the present disclosure, in the non-contact type power transmitting coil, widths of at least some of adjacent pattern portions of the conductor pattern in a direction from a center of an inner diameter of the conductor pattern to an outermost pattern portion of the conductor pattern may be different from one another.

According to another aspect of the present disclosure, a non-contact type power supplying apparatus may include a base having a predetermined area, at least one conductor pattern disposed on at least one surface of the base and having a plurality of turns, and a power unit transmitting power to the conductor pattern to transmit the power externally in a non-contact manner. Widths of at least some of adjacent pattern portions of the conductor pattern in a direction from a center of an inner diameter of the conductor pattern to an outermost pattern portion of the conductor pattern may be different from one another.

According to another aspect of the present disclosure, in the non-contact type power supplying apparatus, widths of at least some of adjacent pattern portions of the conductor pattern in a direction from a center of an inner diameter of the conductor pattern to an outermost pattern portion of the conductor pattern may be different from one another.

BRIEF DESCRIPTION OF THE DRAWINGS

The above and other aspects, features and advantages of the present disclosure will be more clearly understood from the following detailed description taken in conjunction with the accompanying drawings, in which.

DETAILED DESCRIPTION

Figure 1:
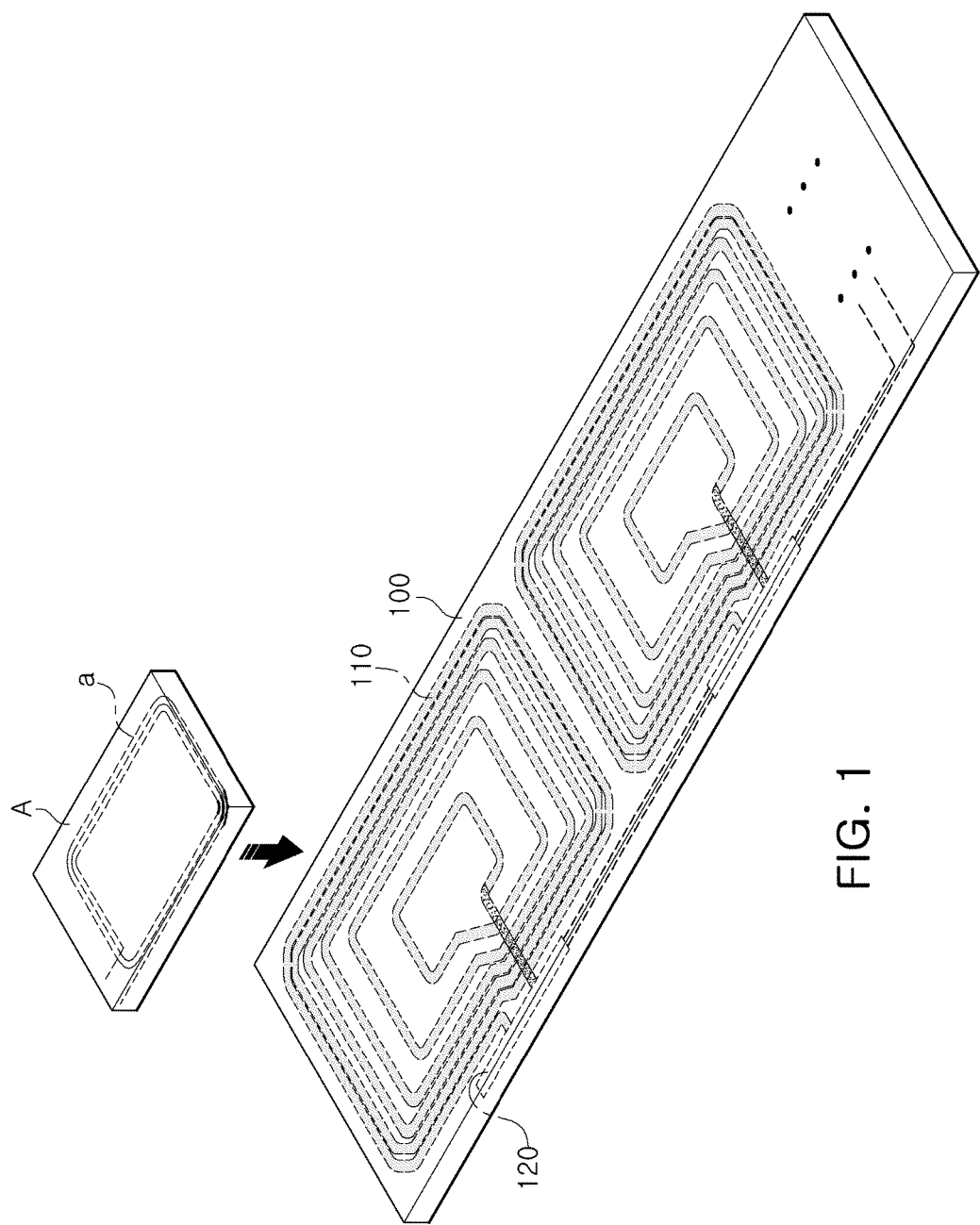
FIG. 1 is a schematic view illustrating a non-contact type power supplying apparatus according to an exemplary embodiment in the present disclosure.

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a schematic view illustrating a non-contact type power supplying apparatus according to an exemplary embodiment in the present disclosure.

Referring to FIG. 1, a non-contact type power supplying apparatus 100 according to an exemplary embodiment in the present disclosure may include a coil 110 and a power unit 120.

The coil 110 may transmit power externally in a non-contact manner. The power unit 120 may transmit the power to the coil 110.

Here, the non-contact manner may refer to, for example, but not limited to, a method of power transmission from a transmitter to a receiver without a direct connection between conductors of the transmitter and the receiver. Additionally, the non-contact manner may be referred to as a contactless method, a wireless transmission method, or the like.

A power receiving apparatus A may be disposed on a power transmitting surface of the non-contact type power supplying apparatus 100. Power of the non-contact type power supplying apparatus 100 may be transmitted from the power transmitting surface of the non-contact type power supplying apparatus 100, such that power from the coil 110 may be transmitted to a power receiving coil a of the power receiving apparatus A.

In a case in which the power receiving apparatus A disposed on the power transmitting surface of the non-contact type power supplying apparatus 100 receives the power from the non-contact type power supplying apparatus 100, power transmission efficiency may change based on a distance between the power receiving apparatus A and the coil 110 of the non-contact type power supplying apparatus 100, for instance, but not limited to, a distance between the power receiving coil a of the power receiving apparatus A and the coil 110 of the non-contact type power supplying apparatus 100.

For example, the non-contact type power transmitting coil according to the exemplary embodiment in the present disclosure may be configured as illustrated in FIGS. 2A-2G.

FIGS. 2A through 2G are schematic plan views of non-contact type power transmitting coils according to exemplary embodiments in the present disclosure.

Figure 2A:
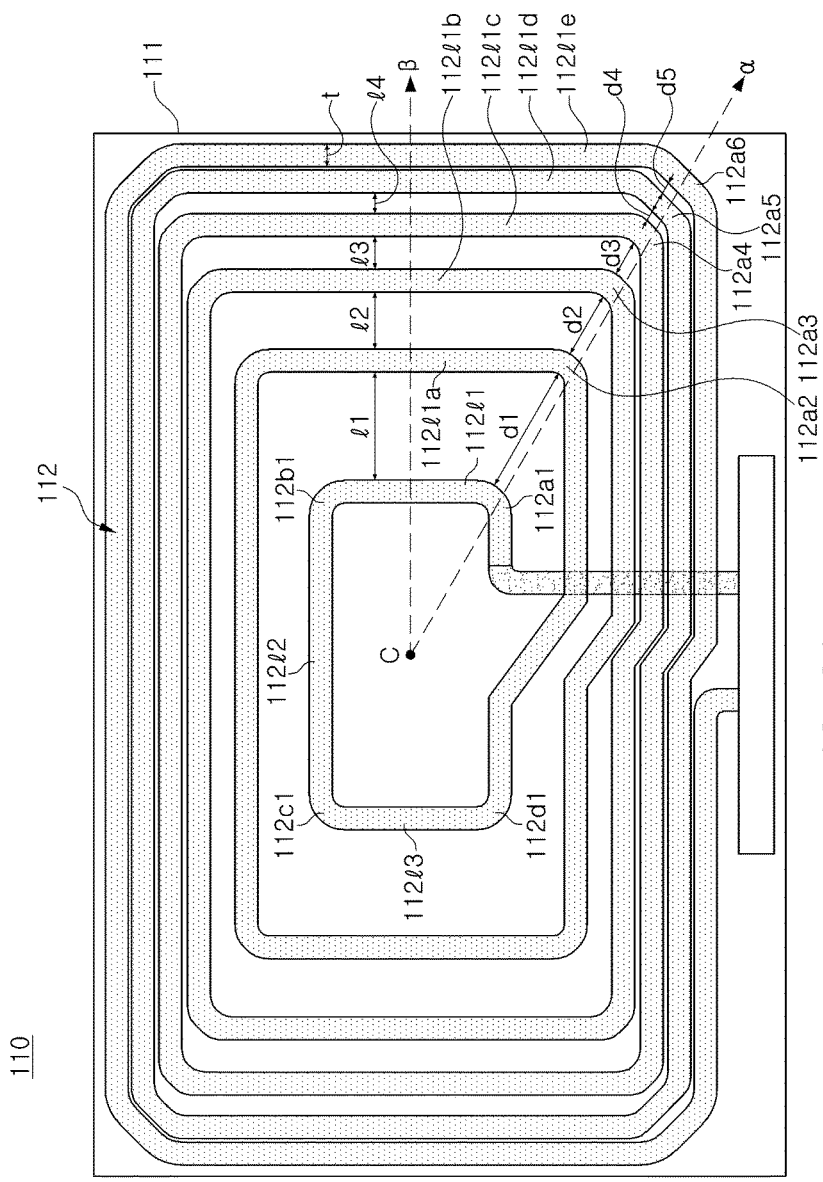
FIGS. 2A through 2G are schematic plan views of non-contact type power transmitting coils according to exemplary embodiments in the present disclosure.

Referring to FIG. 2A, the non-contact type power transmitting coil 110 according to an exemplary embodiment in the present disclosure may include a base 111 and a conductor pattern 112.

As illustrated in FIG. 1, a plurality of conductor patterns may be provided. Since a plurality of the conductor patterns may have the same or similar operation and function as or with a single conductor pattern, a non-contact type power transmitting coil including a single conductor pattern will be described hereinafter for ease of description.

The base 111 may have a predetermined area. The conductor pattern 112 may be disposed on at least one surface of the base 111.

The conductor pattern 112 disposed on the surface of the base 111 may have a plurality of turns, and may include a plurality of bent pattern portions 112a1 to 112a6, 112b1, 112c1, and 112d1, and the plurality of bent pattern portions 112a1 to 112a6, 112b1, 112c1, and 112d1 may be electrically connected to one another so as to form a single pattern having a plurality of turns.

As described above, the plurality of bent pattern portions 112a1 to 112a6, 112b1, 112c1, and 112d1 may be electrically connected to another to thereby have the plurality of turns. In addition, at least one of straight pattern portions 112/1, 112/2, and 112/3 may be formed between at least two bent pattern portions 112a1, 112b1, 112c1 and 112d1, such as 112a1 and 112b1, 112b1 and 112c1, and 112c1 and 112d1, respectively, to thereby form electrical connections between the bent pattern portions 112a1 and 112b1, 112b1 and 112c1, and 112c1 and 112d1. Therefore, a single pattern having the plurality of turns may be formed.

Accordingly, the conductor pattern 112 having a plurality of turns may be provided in various forms such as a circular pattern, a quadrangular pattern, and the like.

At least some of distances d1, d2, d3, d4, and d5, between adjacent bent pattern portions 112a1 and 112a2, 112a2 and 112a3, 112a3 and 112a4, 112a4 and 112a5, and 112a5 and 112a6, respectively, in a direction α from a center c of the conductor pattern 112 to an outermost pattern portion may be different from one another.

For example, the distances d1, d2, d3, d4, and d5 between the adjacent bent pattern portions 112a1 and 112a2, 112a2 and 112a3, 112a3 and 112a4, 112a4 and 112a5, and 112a5 and 112a6 in the direction α, respectively, may be gradually decreased.

Straight pattern portions 112/1, 112/2, 112/3, 112/1a, 112/1b, 112/1c, 112/1d, and 112/1e may be additionally formed. At least some of distances l1, l2, l3, and l4 between adjacent straight pattern portions 112/1 and 112/1a, 112/1a and 112/1b, 112/1b and 112/1c, 112/1c and 112/1d, and 112/1d and 112/1e in a direction β from the center c of the conductor pattern 112 to the outermost pattern portion may be different from one another. For instance, the distances l1, l2, l3, and l4 between adjacent straight pattern portions may be gradually decreased.

For example, the conductor pattern 112 may be disposed on both surfaces of the base 111 for convenience of pattern formation. For example, in order to prevent an overlap of the conductor patterns 112, one or more portions of the conductor patterns 112 transmitting power may be disposed on one surface of the base 111 opposed to the other surface of the base 111 on which the conductor patterns 112 having the plurality of turns are disposed.

The conductor pattern 112 may also be used for a near field communications (NFC) antenna.

Figure 2B:
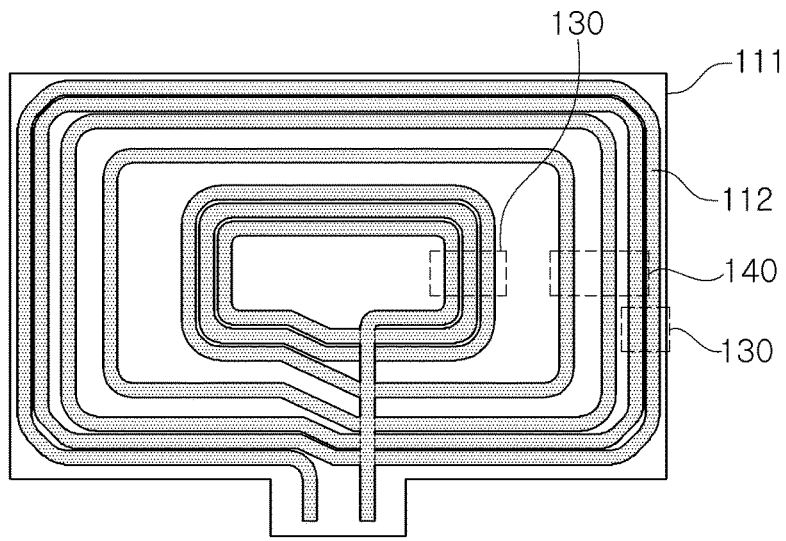

Referring to FIG. 2B, in pattern formation, the conductor pattern 112 may comprise a region 140 having different intervals between pattern portions and a region 130 having the same intervals between the pattern portions. The region 140 having different intervals between the pattern portions and the region 130 having the same intervals between the pattern portions may be provided in an alternating manner. Additionally, the conductor pattern 112 may have a plurality of the regions 130 and/or 140. For instance, the regions 130 and 140 may be alternatively formed.

Figure 2C:
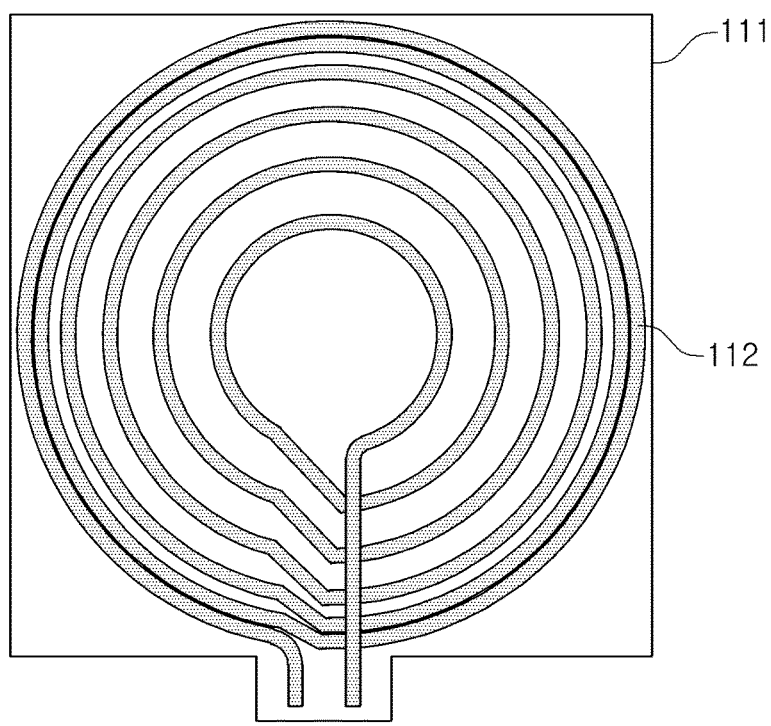
Figure 2D:
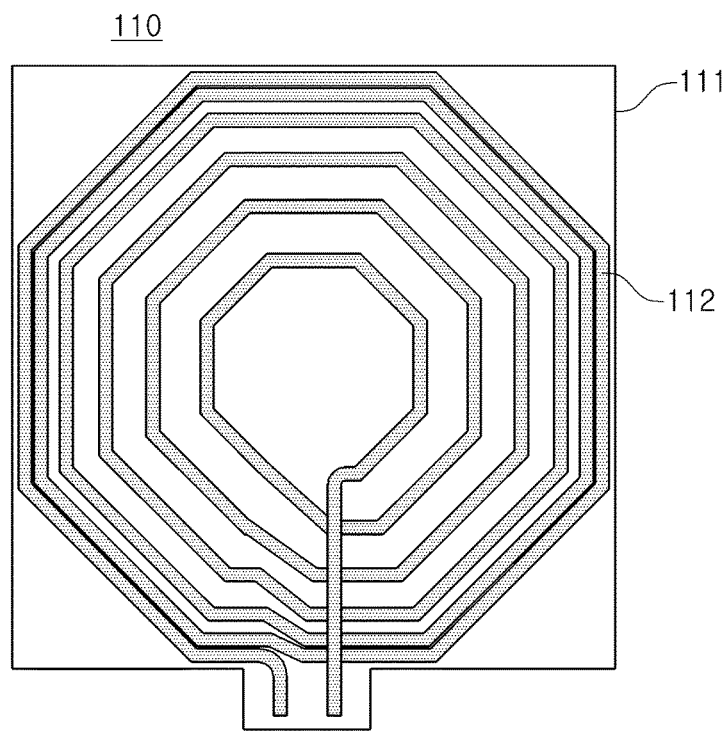

As illustrated in FIGS. 2C and 2D, a conductor pattern 112 may have various shapes, for example, but not limited to, a circular shape or an octagonal shape.

Figure 2E:
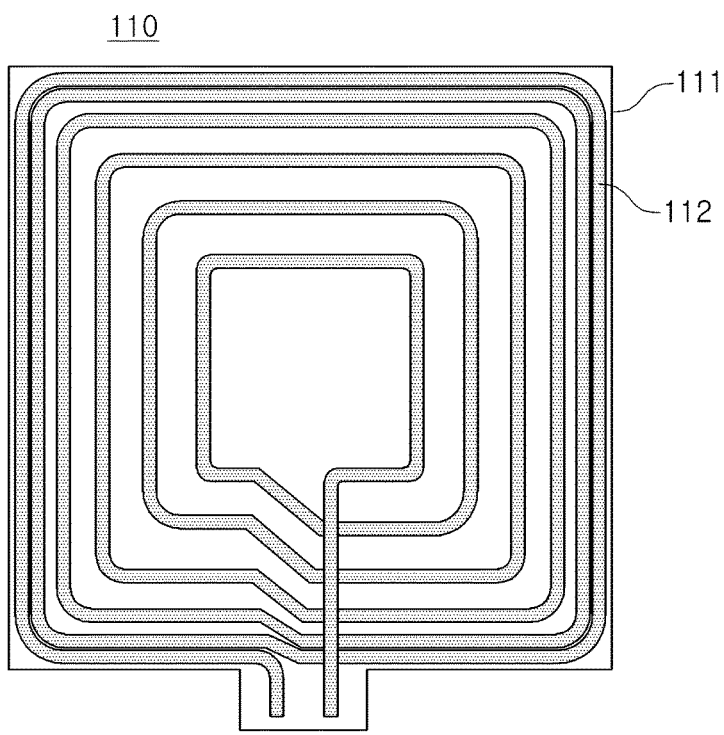

As illustrated in FIG. 2E, a conductor pattern 112 may have the same horizontal length and vertical length. Intervals between pattern portions of the conductor patter 112 may be gradually decreased in an outward direction from the center of the conductor pattern 112. Additionally, the intervals between pattern portions of the conductor patter 112 may be decreased at the same ratio.

Figure 2F:
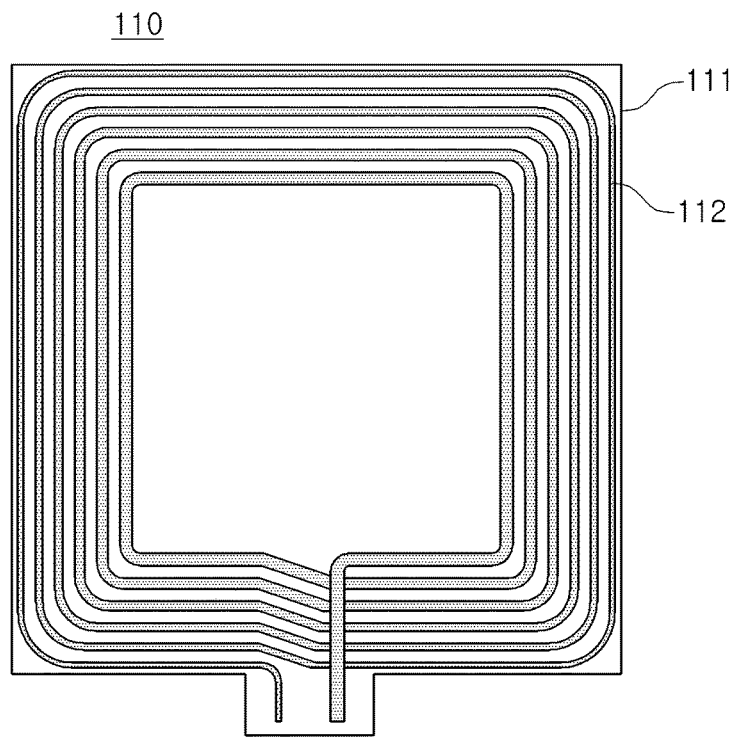

As illustrated in FIG. 2F, pattern portions of the conductor pattern 112 may have the same intervals. Line widths of the conductor pattern 112 may be gradually decreased in an outward direction from the center of the conductor pattern 112.

Figure 2G:
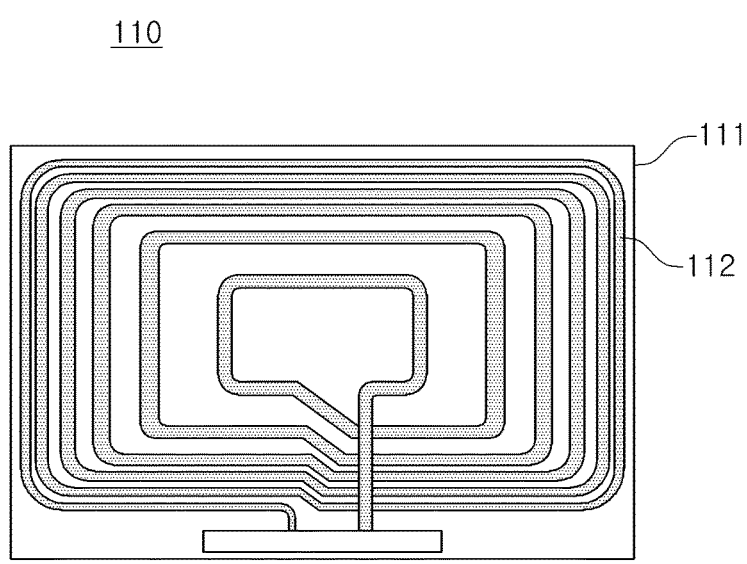

As illustrated in FIG. 2G, intervals between pattern portions of the conductor pattern 112 may be gradually decreased in an outward direction from the center of the conductor pattern 112. Line widths of the pattern portions of the conductor pattern 112 may be gradually decreased in the outward direction from the center of the conductor pattern 112 based on an aspect ratio of the pattern. Line widths of the conductor pattern 112 may be decreased at a different ratio from one another in the same turn. For example, as illustrated in FIG. 2G, the conductor pattern 112 may be provided in a rectangular shape having a horizontal length greater than a vertical length. Line widths of pattern portions of the conductor pattern 112 in a first direction perpendicular to the center of the conductor pattern 112 may be narrower than line widths of pattern portions of the conductor pattern 112 in a second direction horizontal to the center of the conductor pattern 112, or vice versa.

Hereinafter, an electric action or character changed by the above-mentioned intervals between the pattern portions of the conductor pattern 112 will be described.

Figure 3A:
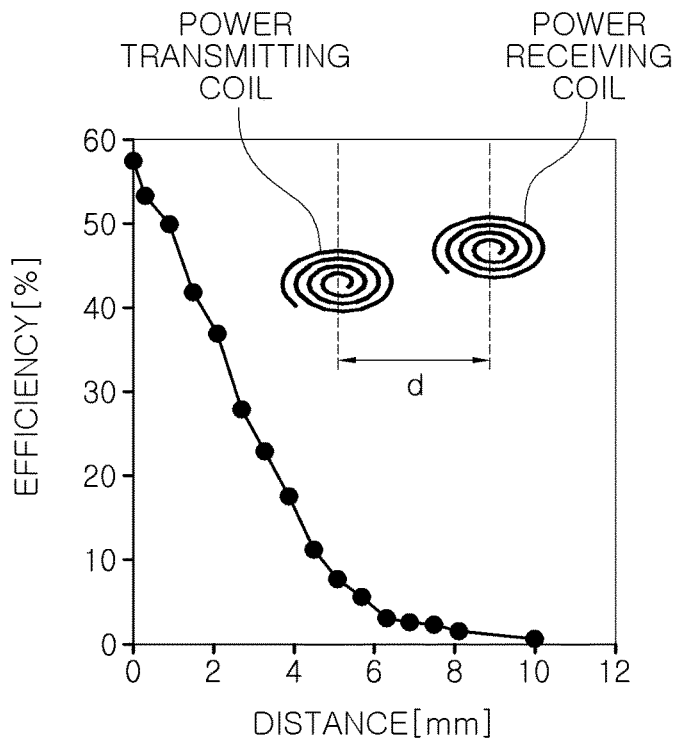
FIG. 3A is an efficiency graph based on a distance between a power transmitting coil and a power receiving coil in accordance with an exemplary embodiment.
Figure 3B:
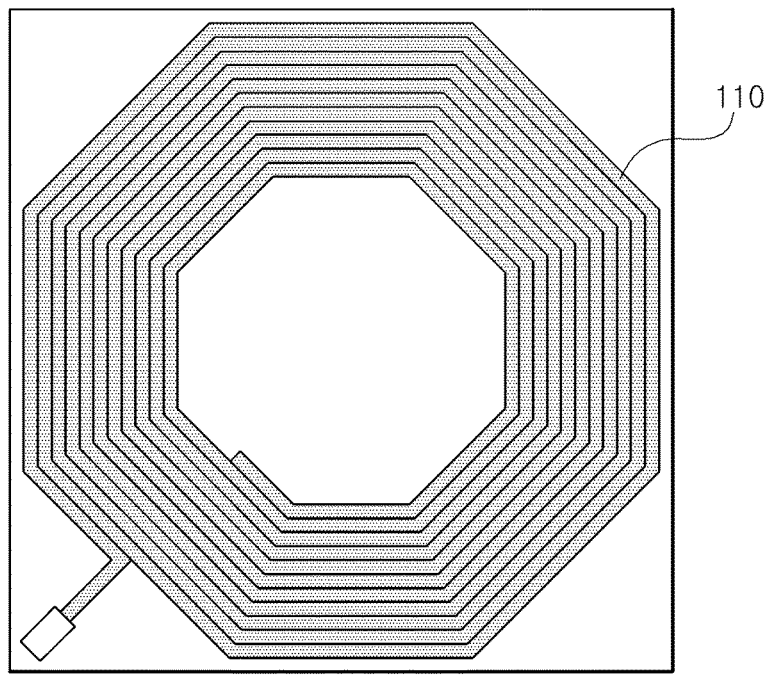
FIG. 3B is a plan view of a power transmitting coil in accordance with an exemplary embodiment.
Figure 3C:
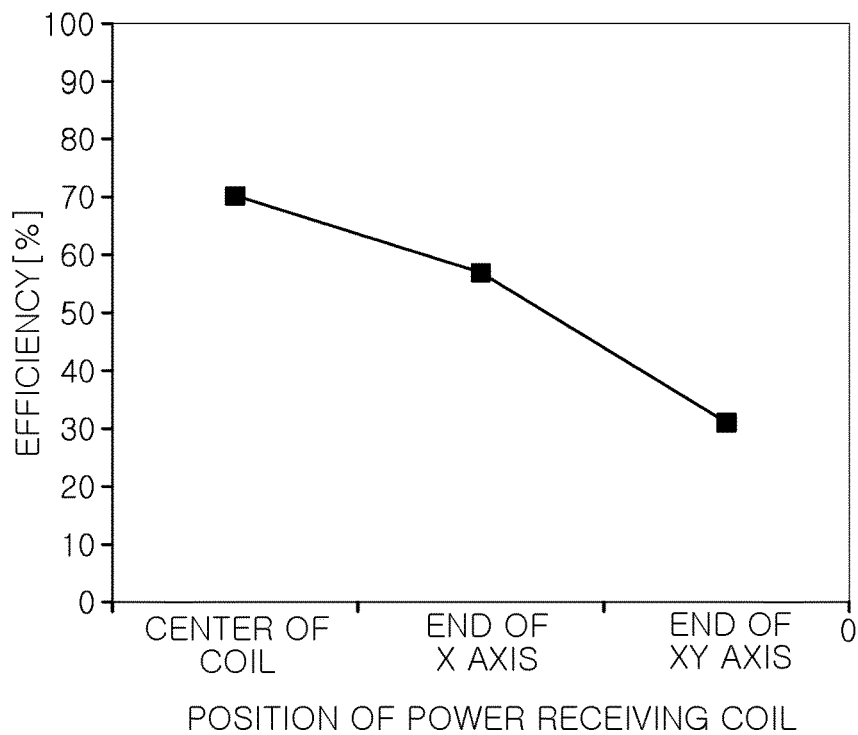
FIG. 3C is an efficiency graph based on positions of the power transmitting coil illustrated in FIG. 3B and the power receiving coil in accordance with an exemplary embodiment.

FIG. 3A is an efficiency graph based on a distance between a power transmitting coil and a power receiving coil in accordance with an exemplary embodiment, FIG. 3B is a plan view of a power transmitting coil in accordance with an exemplary embodiment, and FIG. 3C is an efficiency graph based on positions of the power transmitting coil illustrated in FIG. 3B and the power receiving coil in accordance with an exemplary embodiment.

In general, power transmission efficiency between a power transmitting coil transmitting power in a non-contact manner and a power receiving coil receiving the power may be decreased as a distance d between respective centers of the coils is increased as illustrated in FIG. 3A. Ina case in which coils 110 having a plurality of turns and a pattern array at the same intervals are provided as illustrated in FIG. 3B, high efficiency may be achieved when the centers of the coils 110 coincide through a large amount of a magnetic field being collected on an opening surface at central portions of the coils. However, as illustrated in FIG. 3C, when the center of the power receiving coil deviates from the center of the power transmitting coil, a level of efficiency may be sharply decreased. In detail, when a position of the power receiving coil moves from the center of the power transmitting coil in an outward direction on an X axis or a Y axis, power transmission efficiency may be the lowest level.

Figure 4:
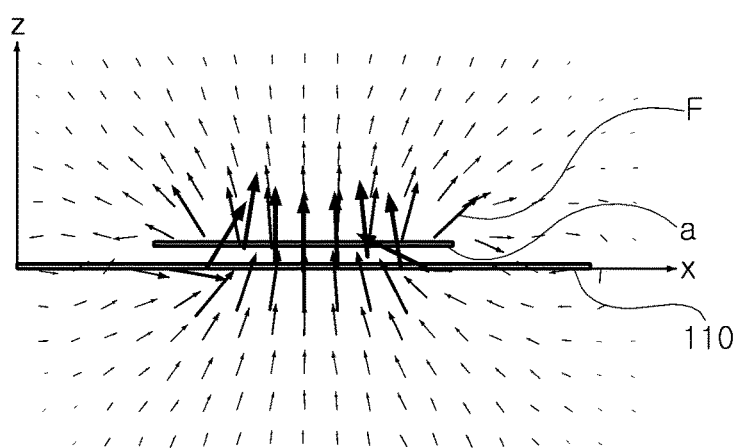
FIG. 4 is a view illustrating strength of a magnetic field of a non-contact type power transmitting coil according to an exemplary embodiment in the present disclosure.

FIG. 4 is a view illustrating strength of a magnetic field of a non-contact type power transmitting coil according to an exemplary embodiment in the present disclosure.

Referring to FIGS. 2A and 4, according to an exemplary embodiment in the present disclosure, the intervals between the pattern portions of the non-contact type power transmitting coil 110, namely, a line density may be relatively high in the outer portion of the coil and may be decreased inwards thereof. In other words, the intervals between the pattern portions of the non-contact type power transmitting coil 110 may be increased towards the center of the coil, hereinafter referred to as non-equidistant intervals.

As illustrated in FIG. 4, according to Ampere's right hand rule, a magnetic field F may be formed to be perpendicular to a direction of a current flow. Strength of the magnetic field F may increase as closer to the current flow. Accordingly, the magnetic field may be formed in the same direction, as currents flow in all electric wires in the central portion of the coil in the same direction, whereby high charging efficiency may be realized. In this example, a magnetic field greater than that of the equidistant coil illustrated in FIG. 3B may be formed in the non-equidistant coil according to the exemplary embodiment in the present disclosure, because a distance from the center of the coil to an innermost pattern portion is relatively reduced as compared to the equidistant coil illustrated in FIG. 3B.

In addition, the strength of the magnetic field may be sharply decreased as farther from the center of the coil because the equidistant coil has a strong magnetic field at the center thereof whereas a line density is high in the outer portion of the coil. Conversely, as compared to the equidistant coil, the non-equidistant coil according to the exemplary embodiment in the present disclosure which has the pattern portions formed between the center of the coil and the outer portion thereof may form a relatively flat magnetic field on a predetermined area. Accordingly, a degree of freedom for the position of the center of the non-equidistant coil may be increased as compared to the equidistant coil. That is, a sharp decrease in the power transmission efficiency may be avoided even in the outer portion of the coil distant from the center of the coil.

However, the strength of the magnetic field may be decreased in the outer portion of the non-equidistant coil. To compensate for the decreased magnetic field, the line density may increase in the outward direction from the center of the non-equidistant coil. In other words, such a power transmission efficiency decrease caused by the magnetic field may be compensated for by transmitting power through the electric field formed by the current flowing in the coil.

Figure 5:
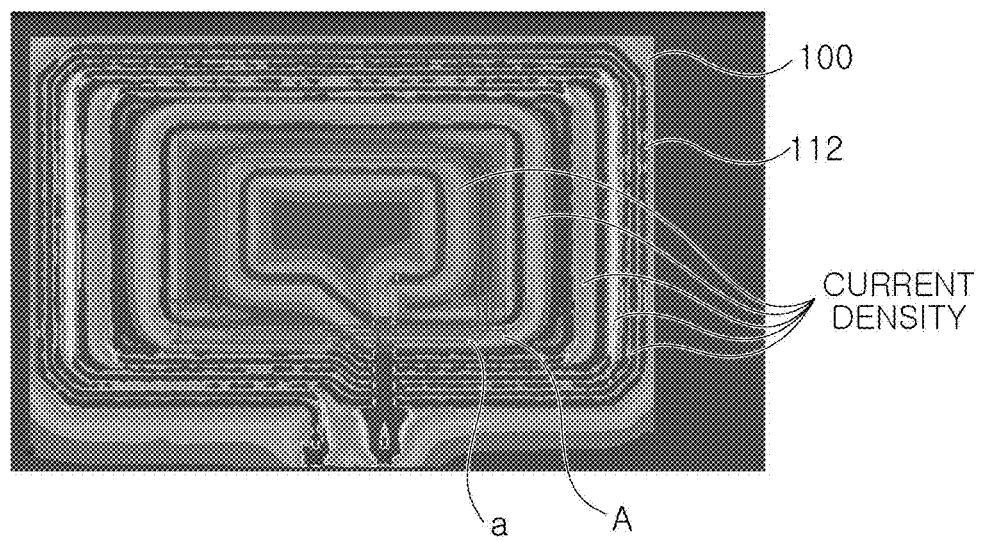
FIG. 5 is a view illustrating a current density of a non-contact type power transmitting coil according to an exemplary embodiment in the present disclosure.

FIG. 5 is a view illustrating a current density of a non-contact type power transmitting coil according to an exemplary embodiment in the present disclosure.

As illustrated in FIG. 5, in a case in which a current density is increased and the power receiving coil a of the power receiving apparatus A is disposed on a coil portion of the non-contact type power transmitting coil having a high line density, a strong electric field may be formed by a high current density, whereby power may be transmitted at a high level of efficiency.

In FIG. 5, blue indicates the coil, and red, yellow, and green indicate degrees of current density. The degrees of current density are lowered in order of red-yellow-green. The current density may be increased in an outward direction such that the strong electric field may be formed in the outer portion of the coil. The current density may be displacement current density.

The line widths t of the pattern portions, as illustrated in FIGS. 2F and 2G, and/or the intervals between the pattern portions of the coil, may be formed in a non-equidistant manner.

For example, in order to increase power transmission efficiency, the current density in the outer portion of the coil may be increased by increasing or decreasing the line width of the coil in an outward direction from the center of the coil.

In addition, as illustrated in FIG. 2G, the line width of the coil may be partially varied based on the aspect ratio of the coil and/or the intervals between the pattern portions of the coil may be varied at different ratios in the same turn.

Figure 6A:
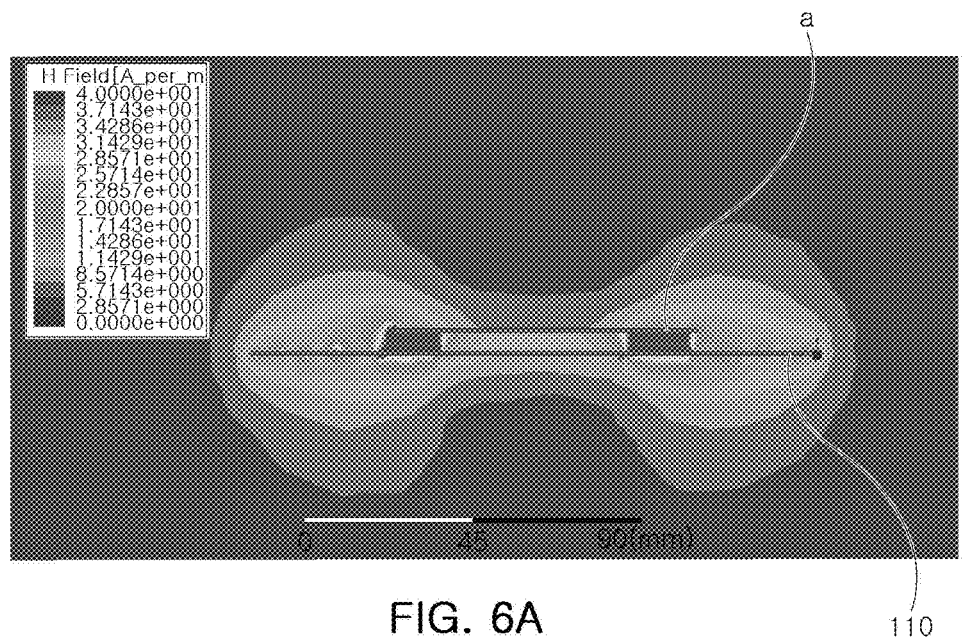
FIGS. 6A and 6B are views illustrating strengths of magnetic fields of a non-contact type power transmitting coil according to an exemplary embodiment in the present disclosure.
Figure 6B:
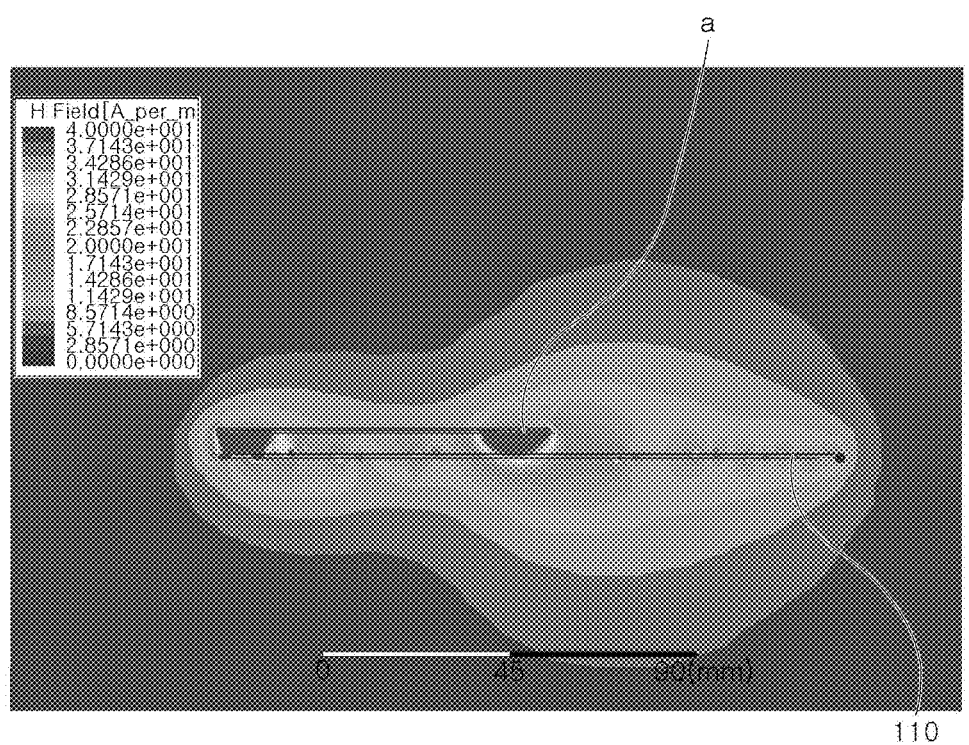

FIGS. 6A and 6B are views illustrating strengths of magnetic fields of a non-contact type power transmitting coil according to an exemplary embodiment in the present disclosure.

In a case in which the power receiving coil a of the power receiving apparatus is disposed at the center of the non-contact type power transmitting coil 110 as illustrated in FIG. 6A, the strength of the magnetic field formed in a direction from the non-contact type power transmitting coil 110 to the power receiving coil a may be increased. Conversely, in a case in which the power receiving coil a of the power receiving apparatus is disposed in the outer portion of the non-contact type power transmitting coil 110 as illustrated in FIG. 6B, the strength of the magnetic field formed in the direction from the non-contact type power transmitting coil 110 to the power receiving coil a may be decreased.

Figure 7A:
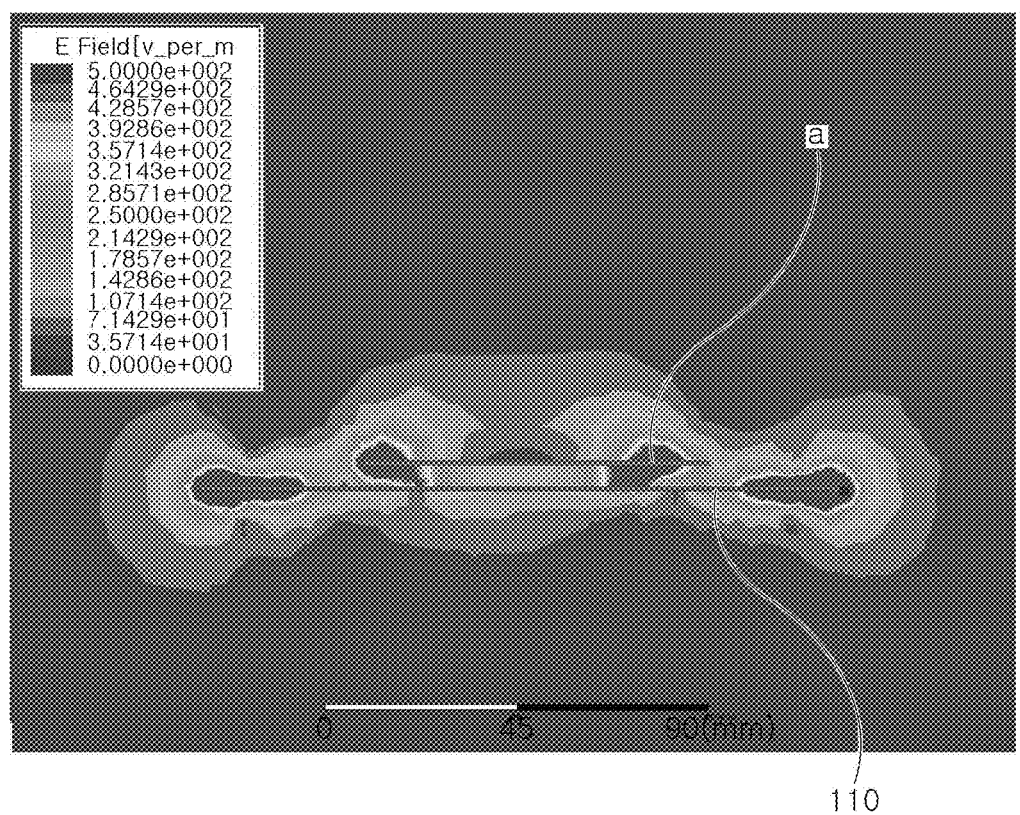
FIGS. 7A and 7B are views illustrating strengths of electric fields of a non-contact type power transmitting coil according to an exemplary embodiment in the present disclosure.
Figure 7B:
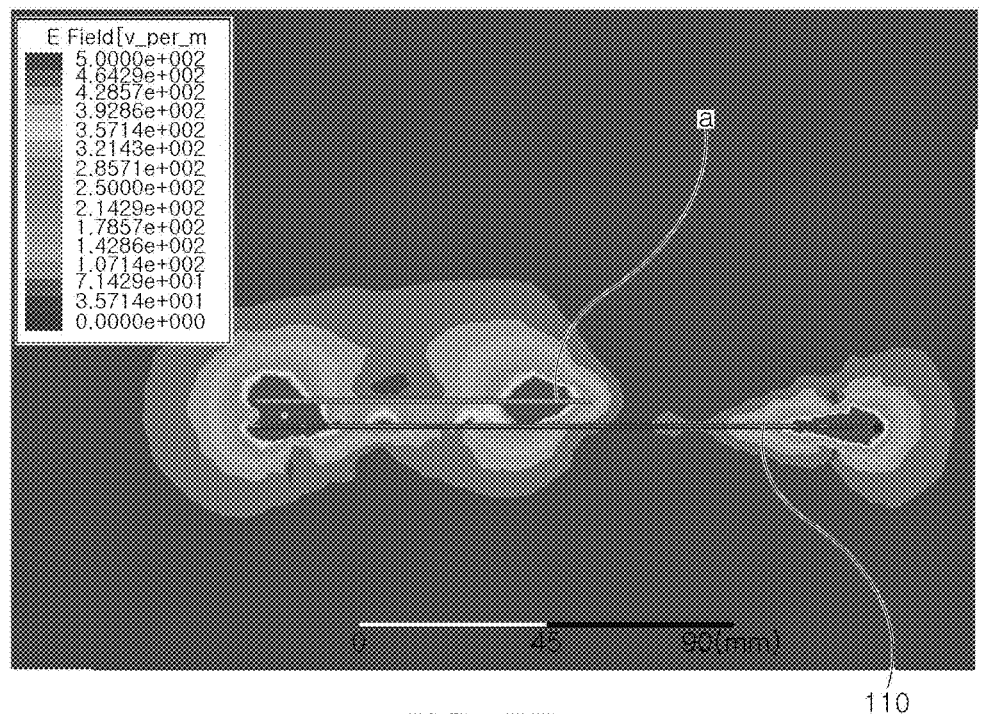

FIGS. 7A and 7B are views illustrating strengths of electric fields of a non-contact type power transmitting coil according to an exemplary embodiment in the present disclosure.

In a case in which the power receiving coil a of the power receiving apparatus is disposed at the center of the non-contact type power transmitting coil 110 as illustrated in FIG. 7A, the strength of the electric field formed in the direction from the non-contact type power transmitting coil 110 to the power receiving coil a may be decreased. Conversely, in a case in which the power receiving coil a of the power receiving apparatus is disposed in the outer portion of the non-contact type power transmitting coil 110 as illustrated in FIG. 7B, the strength of the electric field formed in the direction from the non-contact type power transmitting coil 110 to the power receiving coil a may be increased.

Figure 8:
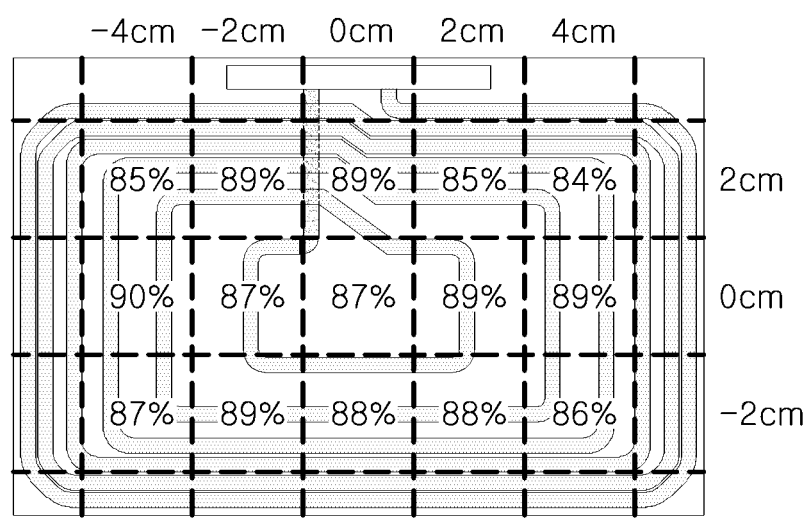
FIG. 8 is a view illustrating power transmitting efficiencies depending on positions of a non-contact type power transmitting coil according to an exemplary embodiment in the present disclosure.

FIG. 8 is a view illustrating power transmitting efficiencies depending on positions of a non-contact type power transmitting coil according to an exemplary embodiment in the present disclosure.

The non-contact type power transmitting coil according to the exemplary embodiment in the present disclosure may have high power transmission efficiency in the central portion thereof by the magnetic field and may have high power transmission efficiency in the outer portion thereof by the electric field. Accordingly, as illustrated in FIG. 8, power transmission efficiency may be uniform in the entirety of the power transmitting coil to enable the power receiving apparatus A to receive uniform power, irrespective of the position of the power receiving apparatus A, resulting in a high degree of position freedom.

Intersecting points of dotted lines in FIG. 8 may indicate the center of the power receiving coil. Even in the case that the center of the power receiving coil is disposed at any position of the power transmitting coil in a similar manner in which the intersecting points are disposed on an entire power transmitting area of the power transmitting coil, wireless power transmission efficiency may be uniform in a range of about 84% to 90%.

As described above, according to some exemplary embodiments in the present disclosure, uniform wireless power transmission efficiency may be obtained irrespective of the position of the center of the power receiving coil disposed on the power transmitting coil by forming the intervals of the pattern portions of the power transmitting coil in a non-equidistant manner.

As set forth above, according to exemplary embodiments in the present disclosure, the power transmission efficiency may be uniform on the entire power transmitting surface of the non-contact type power supplying apparatus.

While exemplary embodiments have been shown and described above, it will be apparent to those skilled in the art that modifications and variations could be made without departing from the scope of the present invention as defined by the appended claims.

What is claimed is:

1. A non-contact type power transmitting coil comprising:
   at least one conductor pattern having a plurality of turns, and configured to transmit power in a non-contact manner,
   wherein intervals between at least some of adjacent pattern portions of the conductor pattern in a direction from a center of the conductor pattern to an outermost pattern portion of the conductor pattern are different from one another, and
   wherein at least some of the adjacent pattern portions of the conductor pattern in the direction comprise different widths.

2. The non-contact type power transmitting coil of claim 1, wherein the intervals between the adjacent pattern portions of the conductor pattern in the direction are gradually decreased.

3. The non-contact type power transmitting coil of claim 1, wherein:
   the intervals between the some of the adjacent pattern portions of the conductor pattern in the direction are provided at different first ratios,
   intervals between at least some of the adjacent pattern portions of the conductor pattern in another direction from the center of the conductor pattern to another outermost pattern portion of the conductor pattern are provided at different second ratios, and
   the first ratios are different from the second ratios.

4. The non-contact type power transmitting coil of claim 1, wherein:
   the intervals between the some of the adjacent pattern portions of the conductor pattern in the direction are provided at different first ratios,
   intervals between at least some of the adjacent pattern portions of the conductor pattern in another direction from the center of the conductor pattern to another outermost pattern portion of the conductor pattern are provided at different second ratios, and
   the first ratios are the same as the second ratios.

5. The non-contact type power transmitting coil of claim 1, wherein:
   at least some of the adjacent pattern portions of the conductor pattern in the direction have different intervals in at least one section of the conductor pattern, and
   at least others of the adjacent pattern portions of the conductor pattern in the direction have the same interval in another section of the conductor pattern.

6. A non-contact type power transmitting coil comprising:
   at least one conductor pattern having a plurality of turns, and configured to transmit power externally in a non-contact manner,
   wherein widths of at least some of adjacent pattern portions of the conductor pattern in a direction from a center of the conductor pattern to an outermost pattern portion of the conductor pattern are different from one another.

7. The non-contact type power transmitting coil of claim 6, wherein the widths of the adjacent pattern portions of the conductor pattern in the direction are gradually decreased.

8. The non-contact type power transmitting coil of claim 6, wherein:
the widths of the some of the adjacent pattern portions of the conductor pattern in the direction are provided at different first ratios,
widths of at least some of the adjacent pattern portions of the conductor pattern in another direction from the center of the conductor pattern to another outermost pattern portion of the conductor pattern are provided at different second ratios, and
the first ratios are different from the second ratios.

9. The non-contact type power transmitting coil of claim 6, wherein:
the widths of the some of the adjacent pattern portions of the conductor pattern in the direction are provided at different first ratios,
widths of at least some of the adjacent pattern portions of the conductor pattern in another direction from the center of the conductor pattern to another outermost pattern portion of the conductor pattern are provided at different second ratios, and
the first ratios are the same as the second ratios.

10. The non-contact type power transmitting coil of claim 6, wherein:
at least some of the adjacent pattern portions of the conductor pattern in the direction have different widths in at least one section of the conductor pattern, and
at least others of the adjacent pattern portions of the conductor pattern in the direction have the same width in at another section of the conductor pattern.

11. A non-contact type power supplying apparatus, comprising:
a coil comprising a base, and at least one conductor pattern disposed on at least one surface of the base and comprising a plurality of turns; and
a power unit configured to supply power to the coil to transmit the power in a non-contact manner,
wherein intervals between at least some of adjacent pattern portions of the conductor pattern in a direction from a center of the conductor pattern to an outermost pattern portion of the conductor pattern are different from one another, and
wherein at least some of the adjacent pattern portions of the conductor pattern in the direction comprise different widths.

12. The non-contact type power supplying apparatus of claim 11, wherein the intervals between the adjacent pattern portions of the conductor pattern in the direction are gradually decreased.

13. The non-contact type power supplying apparatus of claim 11, wherein:
the intervals between the some of the adjacent pattern portions of the conductor pattern in the direction are provided at different first ratios,
intervals between at least some of the adjacent pattern portions of the conductor pattern in another direction from the center of the conductor pattern to another outermost pattern portion of the conductor pattern are provided at different second ratios, and
the first ratios are different from the second ratios.

14. The non-contact type power supplying apparatus of claim 11, wherein:
the intervals between the some of the adjacent pattern portions of the conductor pattern in the direction are provided at different first ratios,
intervals between at least some of the adjacent pattern portions of the conductor pattern in another direction from the center of the conductor pattern to another outermost pattern portion of the conductor pattern are provided at different second ratios, and
the first ratios are the same as the second ratios.

15. The non-contact type power supplying apparatus of claim 11, wherein:
intervals of at least some of the adjacent pattern portions of the conductor pattern in the direction are different from each other in at least one section of the conductor pattern, and
at least others of the adjacent pattern portions of the conductor pattern in the direction have the same interval in another section of the conductor pattern.

16. A non-contact type power supplying apparatus, comprising: a base;
at least one conductor pattern disposed on at least one surface of the base and having a plurality of turns; and
a power unit configured to supply power to the conductor pattern to transmit the power externally in a non-contact manner,
wherein widths of at least some of adjacent pattern portions of the conductor pattern in a direction from a center of the conductor pattern to an outermost pattern portion of the conductor pattern are different from one another.

17. The non-contact type power supplying apparatus of claim 16, wherein the widths of the adjacent pattern portions of the conductor pattern in the direction are gradually decreased.

18. The non-contact type power supplying apparatus of claim 16, wherein:
the widths of the some of the adjacent pattern portions of the conductor pattern in the direction are provided at different first ratios,
widths of at least some of adjacent pattern portions of the conductor pattern in another direction from the center of the conductor pattern to another outermost pattern portion of the conductor pattern are provided at different second ratios, and
the first ratios are different from the second ratios.

19. The non-contact type power supplying apparatus of claim 16, wherein:
the widths of the some of the adjacent pattern portions of the conductor pattern in the direction are provided at different first ratios,
widths of at least some of adjacent pattern portions of the conductor pattern in another direction from the center of the conductor pattern to another outermost pattern portion of the conductor pattern are provided at different second ratios, and
the first ratios are the same as the second ratios.

20. The non-contact type power supplying apparatus of claim 16, wherein
at least some of the adjacent pattern portions of the conductor pattern in the direction have different widths in at least one section of the conductor pattern, and
at least others of the adjacent pattern portions of the conductor pattern have the same width in another section of the conductor pattern.

21. A non-contact type power supply apparatus comprising:
   at least one conductor pattern comprising a plurality of turns and configured to supply power in a non-contact manner,
   wherein at least some spacings between the turns of the conductor pattern are different from each other, and
   wherein at least some of the turns of the conductor pattern comprise different widths from each other.

22. The non-contact type power supply apparatus of claim 21, wherein the spacings between the turns of the conductor pattern are decreased in order from innermost to outermost turns of the conductor pattern.

23. The non-contact type power supply apparatus of claim 21, wherein other spacings between the turns of the conductor pattern are the same.

24. A non-contact type power supply apparatus comprising:
   at least one conductor pattern having a plurality of turns and configured to supply power in a non-contact manner, wherein at least some of the turns of the conductor pattern have different widths from each other.

25. The non-contact type power supply apparatus of claim 24, wherein the widths of the turns of the conductor pattern are decreased in order from innermost to outermost turns of the conductor pattern.

26. The non-contact type power supply apparatus of claim 24, wherein other widths of the turns of the conductor pattern are the same.

* * * * *